US008120804B2

(12) United States Patent
Isobe et al.

(10) Patent No.: US 8,120,804 B2
(45) Date of Patent: Feb. 21, 2012

(54) IMAGE PROCESSING SYSTEM, IMAGE MANAGING DEVICE, METHOD, STORAGE MEDIUM AND IMAGE PROCESSING DEVICE

(75) Inventors: Tami Isobe, Kanagawa (JP); Takao Saka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1123 days.

(21) Appl. No.: 11/856,934

(22) Filed: Sep. 18, 2007

(65) Prior Publication Data

US 2008/0068647 A1 Mar. 20, 2008

(30) Foreign Application Priority Data

Sep. 19, 2006 (JP) ................................. 2006-252710
May 25, 2007 (JP) ................................. 2007-139421

(51) Int. Cl.
*G06F 3/12* (2006.01)
(52) U.S. Cl. .. 358/1.15; 358/440; 358/448; 379/211.01; 709/207; 709/224
(58) Field of Classification Search ................. 358/1.15, 358/440, 448, 1.14, 442, 403; 379/0.1, 211.01, 379/100.1; 709/207, 223, 224, 232
See application file for complete search history.

(56) References Cited

U.S. PATENT DOCUMENTS

| 5,678,046 | A | * | 10/1997 | Cahill et al. | 707/829 |
| 5,729,354 | A | * | 3/1998 | Sugawara et al. | 358/406 |
| 5,802,314 | A | * | 9/1998 | Tullis et al. | 709/246 |
| 6,192,127 | B1 | * | 2/2001 | Nagashima et al. | 380/201 |
| 7,336,381 | B2 | * | 2/2008 | Nakajima | 358/1.15 |
| 7,577,662 | B2 | * | 8/2009 | Kasatani | 1/1 |
| 7,634,654 | B2 | * | 12/2009 | Kakii | 713/158 |
| 7,765,603 | B2 | * | 7/2010 | Tanaka | 726/28 |
| 7,877,328 | B2 | * | 1/2011 | Tanaka | 705/57 |
| 7,889,373 | B2 | * | 2/2011 | Okamoto | 358/1.15 |
| 2005/0002057 | A1 | * | 1/2005 | Oe | 358/1.15 |
| 2006/0179169 | A1 | * | 8/2006 | Yamada | 710/8 |
| 2006/0195535 | A1 | * | 8/2006 | Kakuda | 709/206 |
| 2006/0277229 | A1 | * | 12/2006 | Yoshida et al. | 707/203 |
| 2007/0009230 | A1 | * | 1/2007 | Tanaka | 386/94 |
| 2007/0044040 | A1 | * | 2/2007 | Takahashi et al. | 715/853 |
| 2007/0263262 | A1 | * | 11/2007 | Hayashi | 358/474 |
| 2011/0096348 | A1 | * | 4/2011 | Ebi | 358/1.14 |
| 2011/0102819 | A1 | * | 5/2011 | Morisaki | 358/1.9 |

FOREIGN PATENT DOCUMENTS

| JP | 8-18723 | 1/1996 |
| JP | 9-185474 | 7/1997 |
| JP | 2002-281223 | 9/2002 |
| JP | 2003-84937 | 3/2003 |
| JP | 2003-234860 | 8/2003 |
| JP | 2004-127280 | 4/2004 |
| JP | 2005-33333 | 2/2005 |
| JP | 2006-109115 | 4/2006 |
| JP | 2006-203858 | 8/2006 |

* cited by examiner

*Primary Examiner* — Negussie Worku
(74) *Attorney, Agent, or Firm* — Morrison & Foerster LLP

(57) ABSTRACT

An authentication server receives user information from an MFP, and acquires information on a service available for the user. The authentication server creates information on a menu screen having a selection function of selecting the service available for the user based on the acquired service information. The MFP receives the customized menu screen provided from the authentication server, and displays the menu screen on a display device.

19 Claims, 13 Drawing Sheets

FIG.6

MEMBERSHIP INFORMATION DB 2131

| USER ID | NAME | PASS-WORD | SERVICE ID | ORGANIZATION |
|---------|------|-----------|------------|--------------|
| ⋮ | ⋮ | ⋮ | ⋮ | ⋮ |
| 0000A | A | **** | S0001<br>S0003<br>S0004<br>S0005<br>S1001<br>S1002<br>S2001<br>S2002<br>etc. | COMPANY A |
| 0000B | B | **** | S0003<br>S0004<br>S0005<br>etc. | COMPANY B |
| 0000C | C | **** | S0001 | COMPANY A |
| ⋮ | ⋮ | ⋮ | ⋮ | ⋮ |

FIG.7

SERVICE INFORMATION DB 2132

| SERVICE ID | SERVICE NAME | MENU | FEE |
|---|---|---|---|
| ⋮ | ⋮ | ⋮ | ⋮ |
| S0001 | DOCUMENT MANAGEMENT OF COMPANY A | MAIN MENU | 500Y/M |
| S0002 | DOCUMENT MANAGEMENT OF COMPANY B | MAIN MENU | 500Y/M |
| S0003 | COPY | MAIN MENU | 100Y/M |
| S0004 | SCANNER | MAIN MENU | 100Y/M |
| S0005 | FAX | MAIN MENU | 100Y/M |
| S1001 | REGISTRATION | DOCUMENT MANAGEMENT MENU | 200Y/M |
| S1002 | PRINT | DOCUMENT MANAGEMENT MENU | 200Y/M |
| S2001 | COLOR | COPY MENU | FREE |
| S2002 | MONOCHROME | COPY NEMU | FREE |
| ⋮ | ⋮ | ⋮ | ⋮ |

FIG.8

MODEL INFORMATION DB 2134

| MODEL ID | ... | R01 | R02 | ... |
|---|---|---|---|---|
| DISPLAY DEVICE SIZE | | 320x480 | 100x120 | |
| SCANNER FUNCTION | | OK | OK | |
| PRINT FUNCTION | | OK | OK | |
| FAST PRINT FUNCTION | | OK | | |
| ONLY A4 | | OK | | |
| A3 TO A0 | | OK | | |
| COLOR COPY FUNCTION | | OK | | |
| SORT FUNCTION | | OK | OK | |
| PAPER ALIGNING FUNCTION | | OK | OK | |
| STAPLE FUNCTION | | | OK | |
| PUNCHING FUNCTION | | | OK | |
| ADF FUNCTION | | OK | OK | |

COMPATIBLE SIZE: ONLY A4, A3 TO A0

FINISHER FUNCTIONS: SORT FUNCTION, PAPER ALIGNING FUNCTION, STAPLE FUNCTION, PUNCHING FUNCTION

FIG.9

SERVER INFORMATION DB 2135

| ORGANIZATION NAME | CORRESPONDING DOCUMENT MANAGEMENT SERVER |
|---|---|
| ⋮ | ⋮ |
| COMPANY A | DOCUMENT MANAGEMENT SERVER A |
| COMPANY B | DOCUMENT MANAGEMENT SERVER B |
| ⋮ | ⋮ |

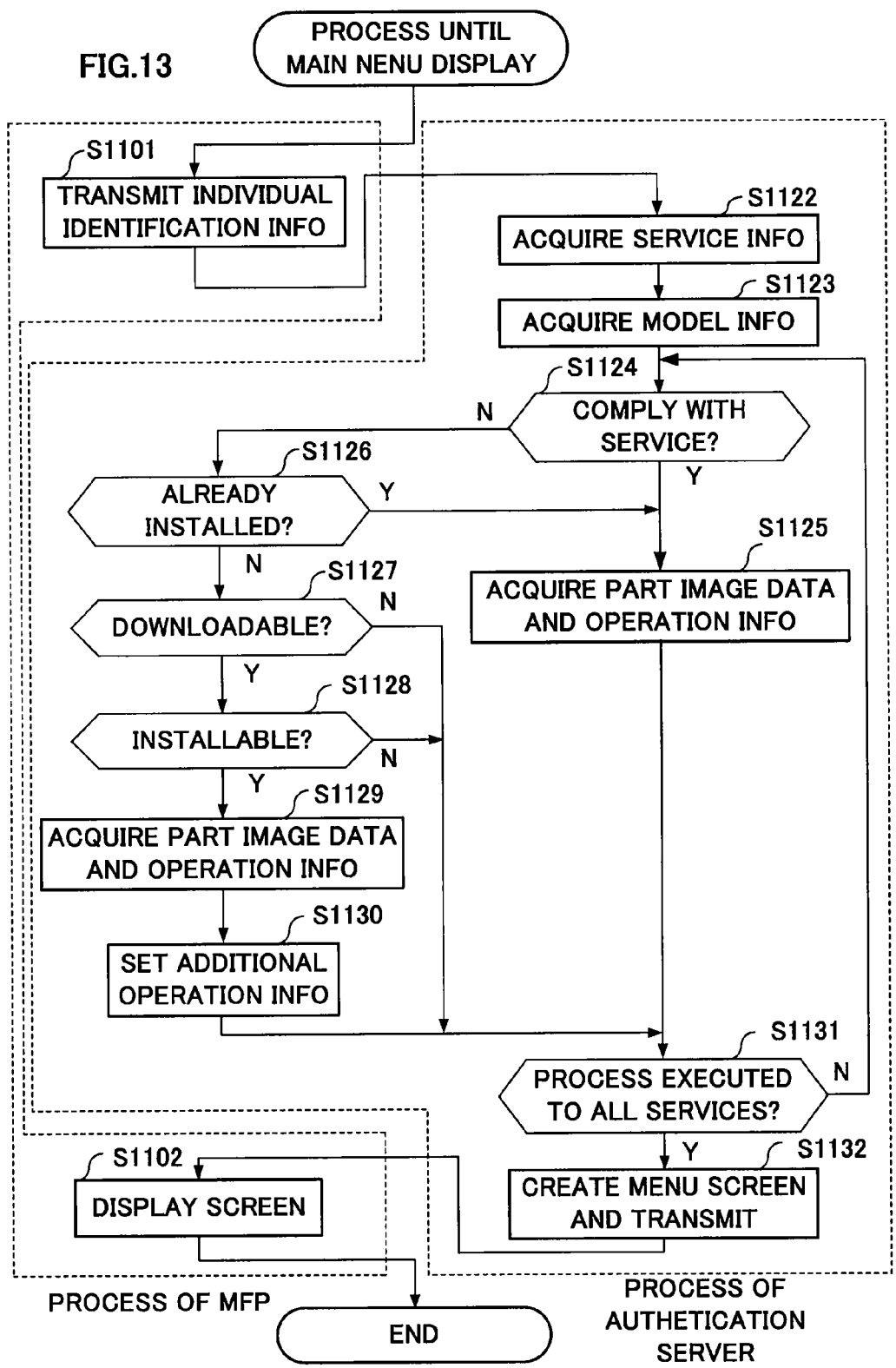

IMAGE PROCESSING SYSTEM, IMAGE MANAGING DEVICE, METHOD, STORAGE MEDIUM AND IMAGE PROCESSING DEVICE

FIELD OF THE INVENTION

The present invention relates to an image processing system, an image processing device, a method, a storage medium and a image processing device.

DESCRIPTION OF THE RELATED ART

Recently, there is proposed a technology which provides various services including a document management service through a system in which a device like an MFP (Multi-Function Peripheral) having basic functions as a copier, a facsimile, a scanner, and the like, and a server providing a service like document management are connected together via a network (e.g., see Unexamined Japanese Patent Application KOKAI Publication No. 2006-339922). According to such a system, a user manipulates the MFP to utilize a service provided by a predetermined server connected via the network within a given authority.

SUMMARY OF THE INVENTION

A plurality of users shares one MFP in such a system. Therefore, in a company or the like, there is a demand such that services available through the MFP would be changed in accordance with the positions and authorities of the users. On the other hand, because organizations of a company have a plurality of MFPs, it is desirable that a user could utilize the same service anytime through any MFPs.

The present invention has been made in view of the foregoing situation, and it is an object of the invention to provide an image processing system which comprises a plurality of MFPs and provides a menu screen customized user by user to an MFP.

To achieve the object, an image processing system according to the first aspect of the invention comprises:

an image managing device; and a image processing device which is connected to the image managing device via a network, and has a plurality of functions, wherein:

the image managing device comprises:

a function-information storing unit configured to store function information associating a user with information for specifying a function that the user has an authority to utilize through the image processing device;

a function-information acquisition unit configured to receive user identification information transmitted from the image processing device, and configured to acquire a function information correspondence with a user specified by the received user identification information, from the function-information storing unit; and a menu transmission unit configured to prepare a menu screen of a function that the user has the authority to utilize based on the function information acquired through the function-information acquisition unit, and configured to transmit the menu screen to the image processing device, and the image processing device further comprises:

a transmission unit configured to accept input of user identification information by a user, and configured to transmit the input user identification information to the image managing device;

a display unit configured to receive the menu screen from the menu transmission unit, and configured to display the received menu screen;

a selection unit configured to select an function from the menu screen in response to manipulation of the user; and an execution unit configured to execute a process of realizing the function selected by the selection unit.

An image managing device according to the second aspect of the invention is connected to a image processing device via a network, supplies a manipulation menu screen to the image processing device, which comprises:

a service information storing unit configured to store service information associating a user with a service that the user has an authority to utilize through the image processing device;

a service information acquisition unit configured to receive user identification information transmitted from the image processing device, and configured to acquire service information correspondence with a user specified by the received user identification information from the service information storing unit; and a menu transmission unit configured to prepare a menu screen for selecting a service available for the user based on the service information acquired by the service information acquisition unit, and configured to transmit the menu screen to the image processing device.

A image processing device according to the third aspect of the invention is connected to an image managing device, which distributes a manipulation menu screen, via a network, and comprises:

a transmission unit configured to accept input of user identification information, and configured to transmit the input user identification information to the image managing device;

a reception unit configured to receive a menu screen, prepared by the image managing device in response to the transmitted user identification information and of a function that a user specified by the user identification information has an authority to utilize, from the image managing device;

a display unit configured to display the received menu screen;

a selection unit configured to select an function through the menu screen in response to manipulation of the user; and an execution unit configured to execute a process of realizing the function selected by the selection unit.

According to the fourth aspect of the invention, there is provided a method of providing a manipulation menu screen to a image processing device connected via a network which comprises:

storing service information which associates a user with a service that the user has an authority to utilize through the image processing device in a storage;

receiving user identification information transmitted from the image processing device, and acquiring service information correspondence with a user specified by the received user identification information from the storage; and preparing a menu screen for selecting a service available for the user based on the acquired service information, and transmitting the menu screen to the image processing device.

According to the fifth aspect of the invention, there is provided a storage medium storing a program for providing a manipulation menu screen to a image processing device, and which allows a computer to function as:

a service information storing unit configured to store service information associating a user with a service that the user has an authority to utilize through the image processing device connected to the computer via a network;

a service information acquisition unit configured to receive user identification information transmitted from the image processing device, and configured to acquire service information correspondence with a user specified by the received user identification information from the service information storing unit; and a menu transmission unit configured to prepare a menu screen for selecting a service available for the user based on service information received by the service information acquisition unit, and configured to transmit the menu screen to the image processing device.

By applying the invention, it becomes possible to provide a menu screen customized user by user.

BRIEF DESCRIPTION OF THE DRAWINGS

These objects and other objects and advantages of the present invention will become more apparent upon reading of the following detailed description and the accompanying drawings in which:

FIG. 6 is a diagram showing an example of the configuration of a membership information DB;

FIG. 7 is a diagram showing an example of the configuration of a service information DB;

FIG. 8 is a diagram showing an example of the configuration of a model information DB;

FIG. 9 is a diagram showing an example of the configuration of a server information DB;

FIG. 13 is a flowchart for explaining a menu screen display process according to a second embodiment of the present invention.

DETAILED DESCRIPTION OF THE PREFERRED EMBODIMENT

First Embodiment

Image processing systems according to the embodiments of the invention will be explained with reference to the accompanying drawings.

Figure 1:
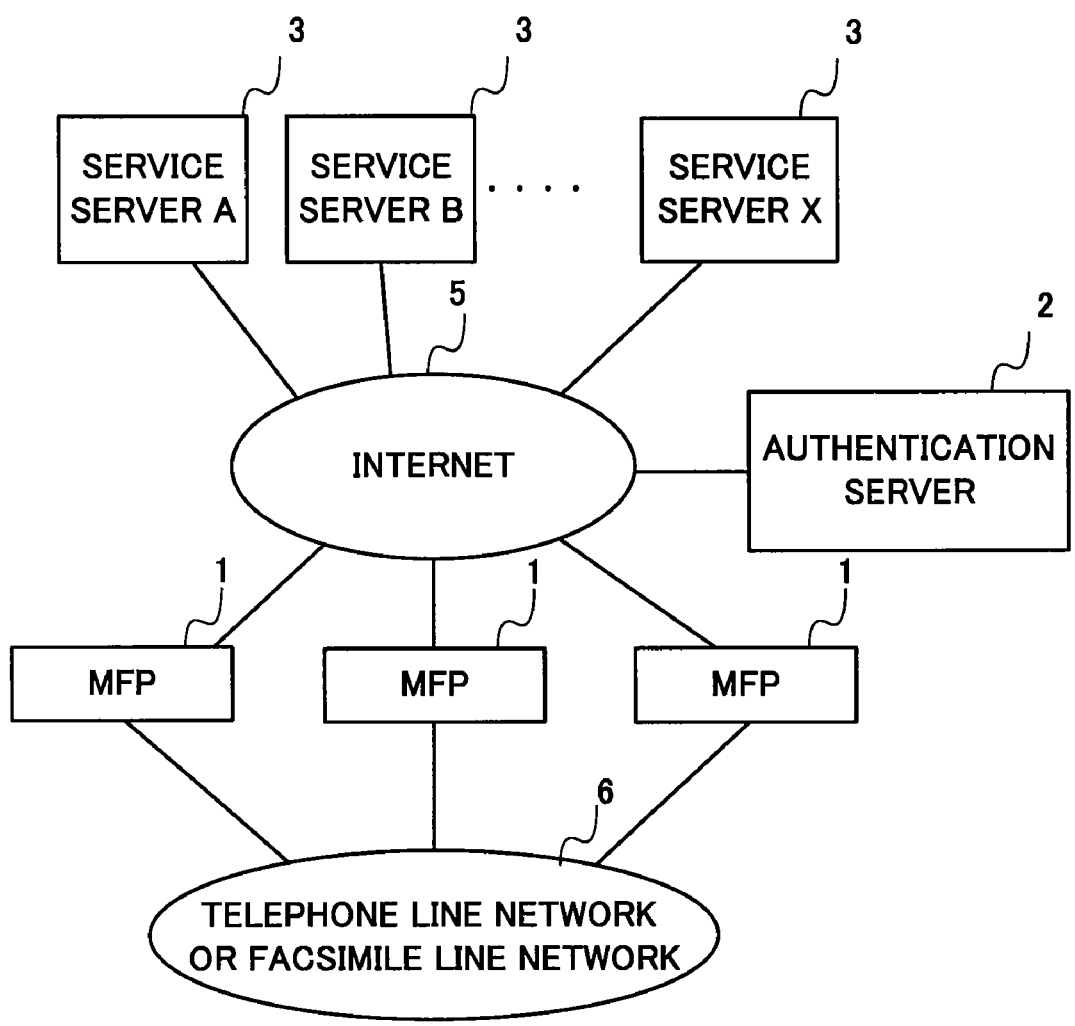
FIG. 1 is a diagram for explaining the general structure of an image processing system.

As shown in FIG. 1, an image processing system comprises an authentication server 2, a plurality of service servers 3, and a plurality of MFPs (Multi-Function Peripherals) 1, all connected together via a network 5.

Figure 2:
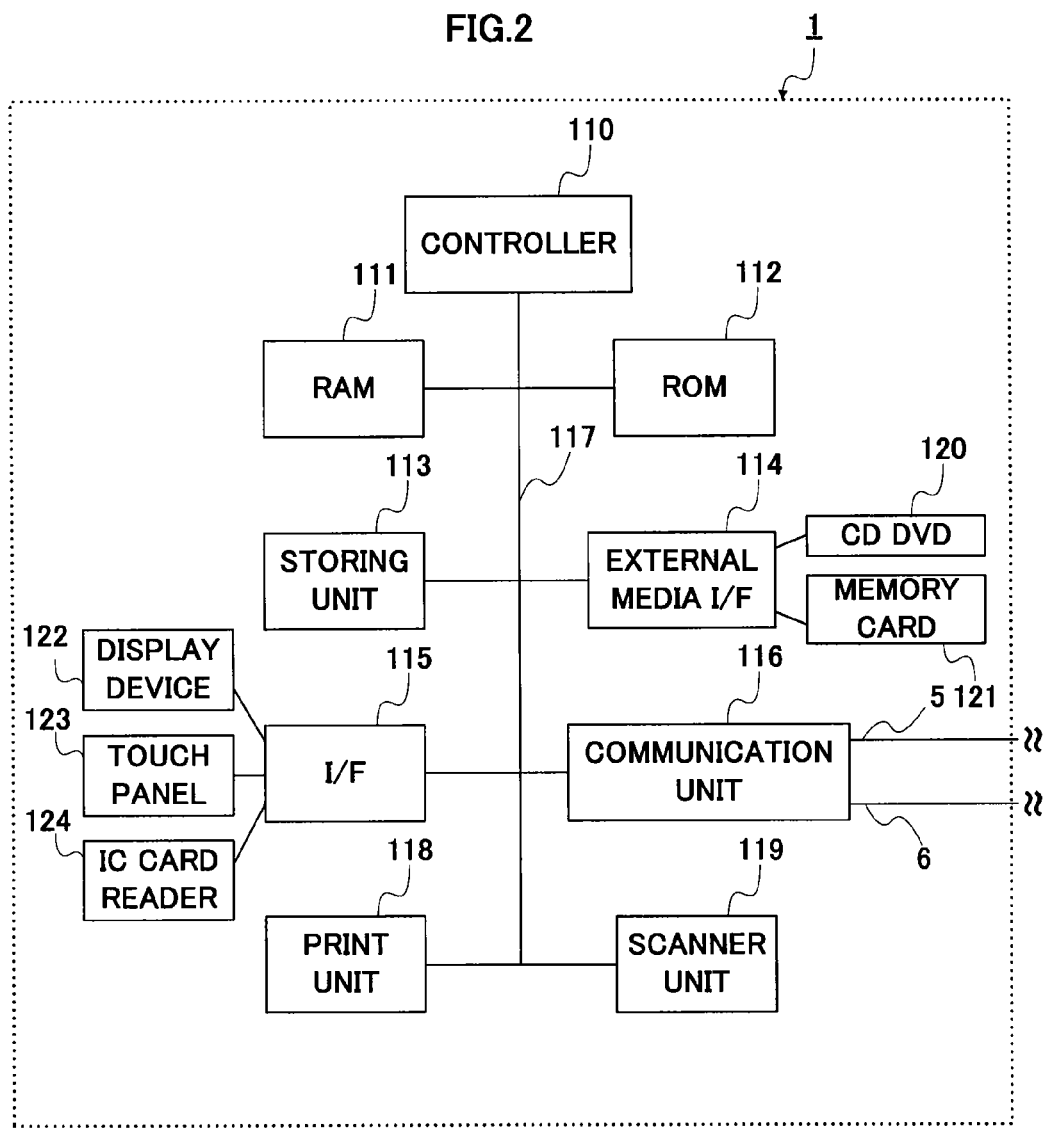
FIG. 2 is a diagram for explaining the structure of an MFP.

An MFP 1 has basic functions as a copier, a facsimile, a scanner, and the like, and further has a function as a client of the service server 3 which provides a document management service function. As shown in FIG. 2, the MFP 1 comprises a controller 110, a RAM (Random Access Memory) 111, a ROM (Read Only Memory) 112, a storing unit 113, an external media I/F (InterFace) 114, an I/F (InterFace) 115, a communication unit 116, a print unit 118, and a scanner unit 119.

The controller 110 comprises a CPU (Central Processing Unit) or the like, and controls the MFP 1 entirely. The controller 110 launches a predetermined application program (e.g., a spreadsheet display application, a document display application or the like) stored in the storing unit 113 or the like beforehand, and executes manipulation/processing of an electrical file (e.g., referencing, printing). The operation of the controller 110 will be discussed in detail later.

The RAM (Random Access Memory) 111 is a volatile memory which stores data necessary for a process to be executed by the controller 110 (e.g., electrical file data).

The ROM (Read Only Memory) 112 is a non-volatile memory which stores a program or the like for the controller 110 to control the MFP 1 entirely. For example, the ROM 112 stores a program of controlling transmission/reception of an electrical file between the controller 110 and the authentication server 2.

A display device 122 comprises a dot-matrix type liquid crystal display device or the like, constitutes one output device of the MFP 1, and displays arbitrary characters, symbols, numbers, figures, manipulation menus, and the like.

A touch panel 123 is a contact-type input device, stacked together with the display unit 122, and constitutes a touch-panel type display device.

An IC card reader 124 is a contact-type or a non-contact type reader which reads out a user ID stored in an IC card for user authentication.

The I/F 115 provides display data from the controller 110 to the display device 122, provides input data from the touch panel 123 to the controller 110, and mediates communication between an IC card and the controller 110 through the IC card reader 124.

Note that the I/F 115 may have an interface function with input devices, such as a keyboard, and a mouse.

The external media I/F 114 is an interface for reading out data from a drive device 120 for a disk recording medium, such as a CD or a DVD, and a memory card 121 like a USB memory, and for writing data in the memory card 121 or the like.

The storing unit 113 comprises an HDD (Hard Disk Drive) or the like, and stores data necessary for the controller 110 to perform predetermined operations. The storing unit 113 stores a software application for the MFP 1 to execute various operations (e.g., referencing, copying) with respect to an electrical file. The controller 110 extracts the application program stored in the storing unit 113 in the RAM 111, and executes the application program, thereby performing various operations with respect to various files. The predetermined software application is stored in the storing unit 113 in the embodiment, but may be stored in the ROM 112.

The communication unit 116 comprises an NIC (Network Interface Card), a modem device or the like, has an interface for establishing connections with the network 5 and a telephone line network (facsimile line network) 6, performs communication with the network 5 based on a TCP/IP protocol, and performs facsimile communication with the telephone line network 6. The communication unit 116 may include, for example, an infrared communication device. An MFP 1 which has no facsimile function may not be connected to the telephone line network 6.

A system bus 117 is a transmission path for forwarding an order or data among the controller 110, the RAM 111, the ROM 112, the storing unit 113, the external media I/F 114, the I/F 115, the communication unit 116, the print unit 118, and the scanner unit 119.

The print unit 118 includes a print device which prints out electrical file data. That is, a user manipulates an input device like the touch panel 123, thereby printing data on a desired electrical file. The print unit 118 also includes a device having a function of copying a paper document, a picture, a photograph, and the like.

The scanner unit 119 includes a scanner which reads out a paper document, a picture, a photograph and the like, converts those into digital data, and saves it.

Figure 3:
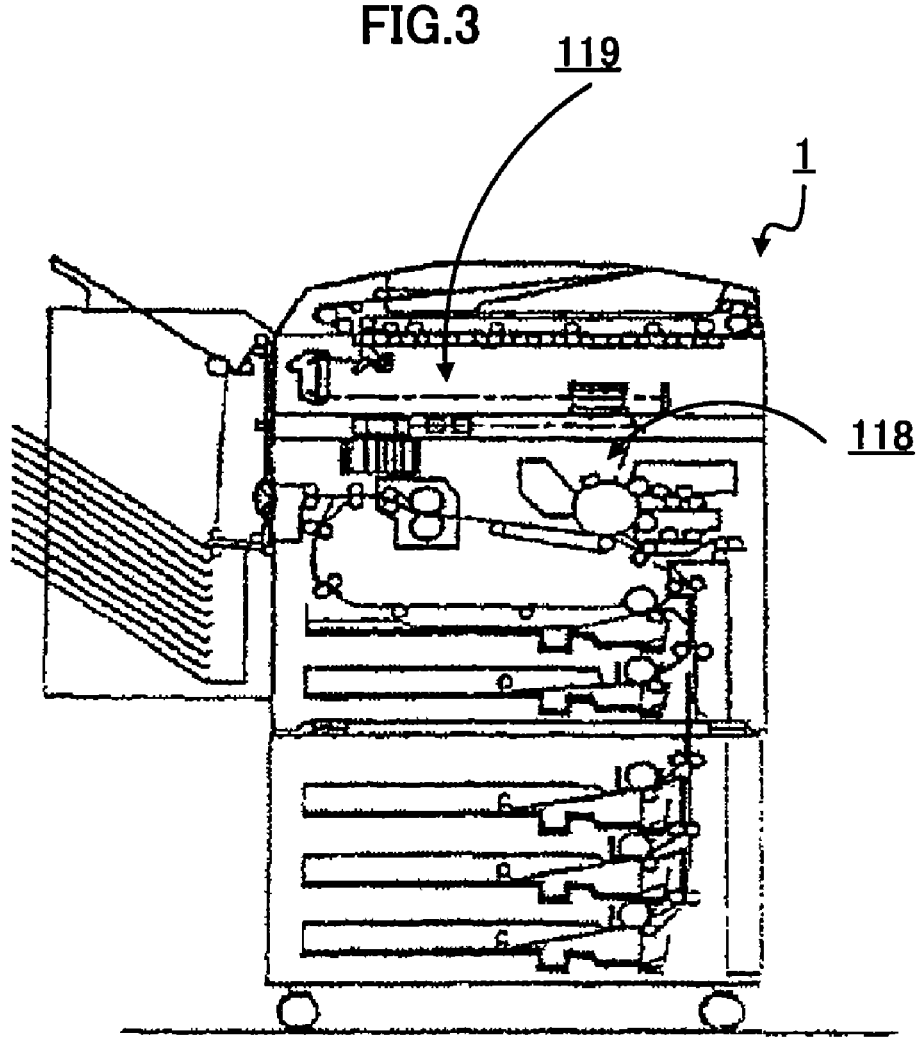
FIG. 3 is a diagram for the overview of the MFP.

The specific overview of the MFP 1 is shown in FIG. 3. The MFP 1 has the print unit 118 which has a paper feeder, a print engine, and the like and can perform copying, a scanner unit 119 having a function as a scanner, and the communication unit 116 (not shown in FIG. 3) having a function as a facsimile and a communication function.

Figure 4:
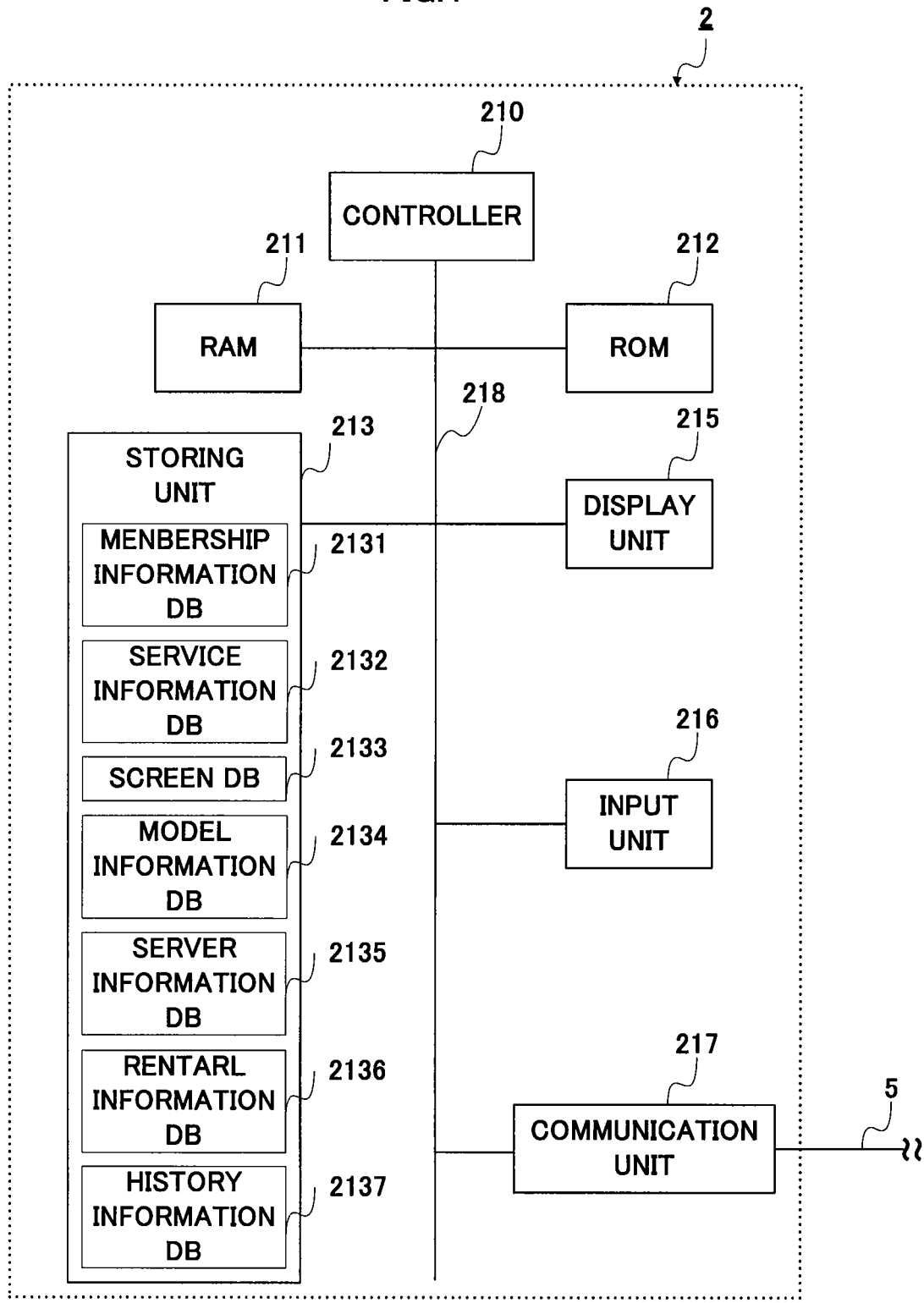
FIG. 4 is a diagram for explaining an authentication server.

Next, an explanation will be given of the authentication server 2 shown in FIG. 1. The authentication server 2 authenticates a user, prepares a menu for selecting a service that the individual user has an authority to utilize user by user, and provides the menu to the MFP 1. As shown in FIG. 4, the authentication server 2 has a controller 210, a RAM 211, a ROM 212, a storing unit 213, a display unit 215, an input unit 216, a communication unit 217, and a bus 218.

The controller 210 comprises a CPU (Central Processing Unit) or the like, and controls the authentication server 2 entirely.

The RAM (Random Access Memory) 211 is a volatile memory which stores data necessary for a process to be executed by the controller 210.

The ROM (Read Only Memory) 212 is a non-volatile memory which stores a program or the like for the controller 210 to control the authentication server 2 entirely. The ROM 212 stores an authentication program for the controller 210 to authenticate a user, and a menu creation program for creating a menu user by user.

The storing unit 213 comprises a hard disk or the like, and has a membership information DB 2131 (see, FIG. 6 for detail), a service information DB 2132 (see, FIG. 7 for detail), a screen DB 2133, a model information DB 2134 (see, FIG. 8 for detail), a server information DB 2135 (see, FIG. 9 for detail), a rental information DB 2136, a history information DB 2137, and the like. Examples of the configurations of the individual databases will be explained below.

The membership information DB 2131 shown in FIG. 6 takes a user ID for identifying a user who has preliminary registered for use of the system as a key, and registers information related to the user, such as a name, a password for authentication, a service ID, and an organization. The user ID is identification information for specifying a user. The name is the name of the user. The password is authentication information of the user (person who is about to utilize the MFP 1). The service ID is an identification number for a service available for the user among services that a service provider provides. The service ID will be explained in detail below through an explanation given of the service information DB 2132. The organization is an organization name where the user belongs.

Information on services that the service provider provides is registered in the service information DB 2132 shown in FIG. 7. Specifically, with a service ID for specifying a service taken as a key, a service name, a menu, and a fee are registered. The service name is the name of a service. The "menu" is the name of a kind of a menu for selecting the service. For example, regarding a service having service IDs S0001 to S0005, a title "main menu" is stored in an item "menu". Thus, services specified by the service IDs S0001 to S0005 are selectable from a main menu. The fee is a fee when the service provider provides the service.

In the screen DB 2133, image data as a part to be displayed in a manipulation screen, and information on operations when the part is selected through the manipulation screen are stored in association with a service registered in the service information DB 2132. An explanation will now be given with reference to an example of a main menu screen shown in FIG. 10B. In the main menu screen in FIG. 10B, a "document management service button", a "copy button" a "FAX button", and a "scanner button" are arranged. The screen DB 2133 stores menu parts (buttons in this case) selectable in this manner with respect to the individual services as images. For example, with respect to a service like document management service (company A), image data of a button having a label "document management service (company A)" and information on operations when the button is selected are registered. The controller 210 of the authentication server 2 combines plural pieces of image data corresponding to services selectable through a menu, and creates data on one menu screen in the end. The created menu screen data is transmitted to the MFP 1. Alternatively, the authentication server 2 may transmit image data corresponding to services selectable from a menu to the MFP 1, and the MFP 1 may create menu screen data based on the screen data. In this case, it is desirable that the MFP 1 should have an image processor, and display the image data on the display device 122. Note that it is preferable that part image data and information on operations when a part is selected registered in the screen DB 2133 should be created every time a service is registered in the service information DB 2132 and updated.

The model information DB 2134 shown in FIG. 8 stores information on various device models of MFPs 1 that the authentication server 2 provides a menu screen. A model ID for specifying the model of an MFP 1, a size of the display device 122 of that model, and a function of that model are stored in each record of the model information DB 2134.

In the model information DB 2134, information to the effect that what function each model has is managed by a flag. For example, when there is a function that a model complies with in various functions (scanner function, print function, fast-speed print function, compatible paper size (A4 only, or A3 to A0), color copy function, finisher function (sorting function, paper aligning function, staple function, punching function, or the like), and Auto Document Feeder (ADF) function) indicated in fields shown in FIG. 8, information to the effect that a model complies with a function is stored in the field. When a model does not comply with a function, nothing is stored or information to the effect that a model does not comply is stored.

Functions other than ones shown in the figure may be registered in the model information DB 2134. Alternatively, functions that all MFPs 1 in the system have may not be registered in the model information DB 2134, but may be set as default functions. For example, in a case where a print function is selected, it is set beforehand that an MFP 1 is compatible with monochrome printing even if the print function is not registered in the model information DB 2134.

The server information DB 2135 shown in FIG. 9 is a database where information for specifying a document management server available for each organization is registered. With an organization name taken as a key, information on a document management server that the organization can utilize is registered in each record.

The rental information DB 2136 stores information to the effect that whether or not an MFP 1 is subjected to rental or lease. If the MFP 1 is subjected to rental or lease, the rental information DB 2136 stores an organization name which rents (leases) the MFP 1 and rental fee information in association with each other.

The history information DB 2137 stores a manipulation history of a user with respect to an MFP 1 in the system. The history information DB 2137 stores the ID of a user who performed manipulation, the content of manipulation, and manipulation information like a file name subjected to manipulation in association with one another.

Information stored in the membership information DB 2131, the service information Db 2132, the screen DB 2133, the model information DB 2134, the server information DB 2135, the rental information DB 2136 and the like may be input through the input unit 216 to be discussed later, or transmitted from other computers and systems via the network 5.

The membership information DB 2131, the service information DB 2132, the screen DB 2133, the model information DB 2134, the server information DB 2135 are saved in the storing unit 213, but each of which may be located on another server connected to the network 5.

Return to FIG. 4, the authentication server 2 has the display unit 215 and the input unit 216 from the standpoint of maintenance or the like. The display unit 215 includes an output device like an LCD (Liquid Crystal Display). The input unit 216 inputs arbitrary data and information.

The communication unit 217 comprises an NIC (Network Interface Card) or the like, and serves as an interface to connect the authentication server 2 to the network 5. The communication unit 217 may include, for example, a modem device, an infrared communication device.

The system bus 218 is a transmission path for forwarding an order and data among the controller 210, the RAM 211, the ROM 212, the storing unit 213, the display unit 215, the input unit 216, the communication unit 217.

Figure 5:
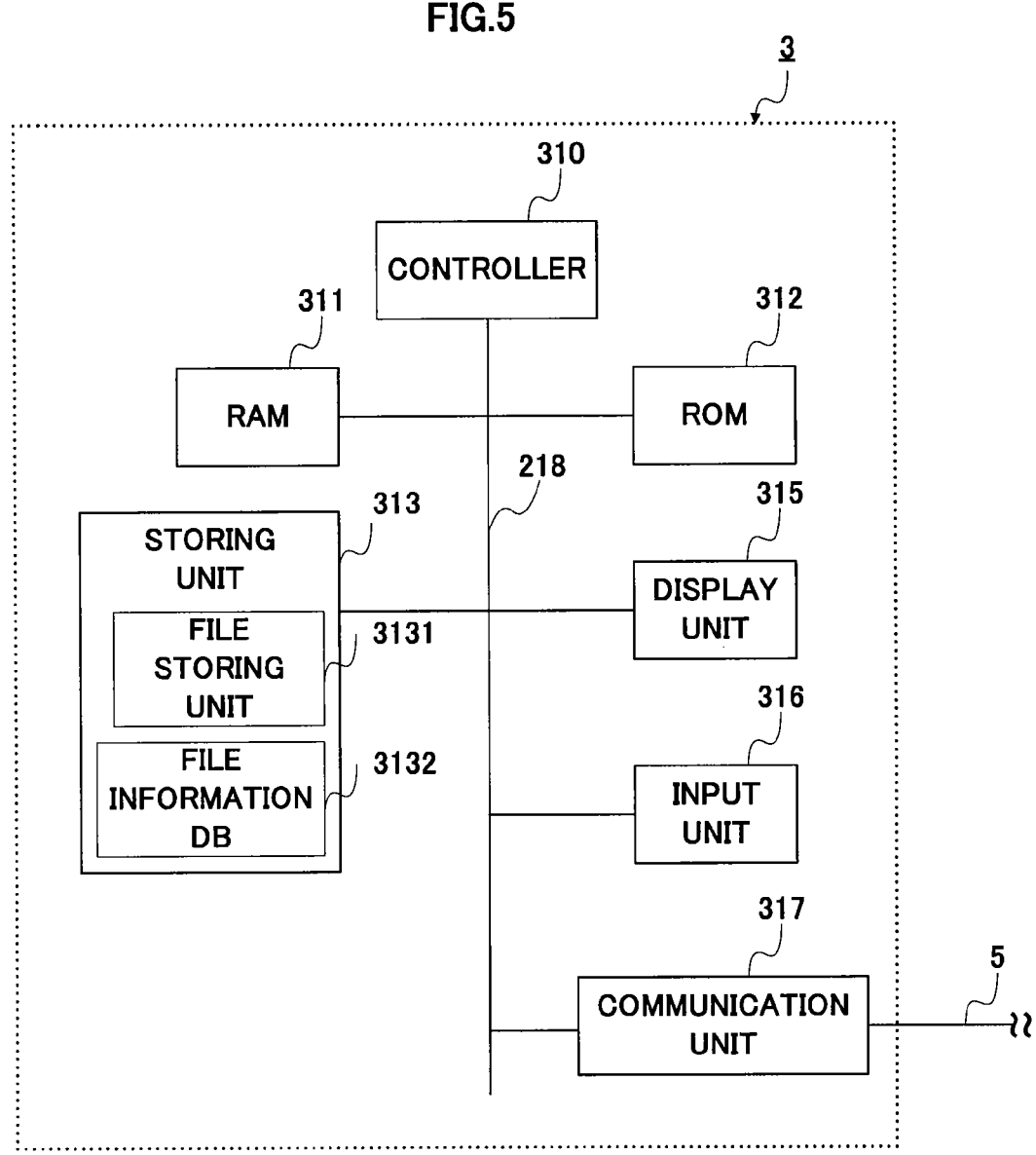
FIG. 5 is a diagram for explaining the structure of a service server.

Next, an explanation will be given of the service server 3 shown in FIG. 1. The service server 3 stores and manages electrical files in an integrated fashion. The service server 3 provides a service which enables operation of a file (viewing, printing, deleting, taking out or the like) under management of the service server 3 through a client device including an MFP 1 connected thereto via the network 5, and registration of a file transmitted from the client to a designated location. As shown in FIG. 5, the service server 3 comprises a controller 310, a RAM 311, a ROM 312, a storing unit 313, a display unit 315, an input unit 316, a communication unit 317, and a bus 318. An explanation will be given of each component below.

The controller 310 comprises a CPU (Central Processing Unit) or the like, and controls the service server 3 entirely.

The RAM (Random Access Memory) 311 is a volatile memory which stores data necessary for a process to be executed by the controller 310.

The ROM (Read Only Memory) 312 is a non-volatile memory which stores a program for the controller 310 to control the service server 3 entirely. The ROM 312 stores a program for transmitting/receiving an electrical file and folder information with an MFP 1, in addition to a program for managing an access authority to a folder and a file stored in the storing unit 313 to be discussed later.

The storing unit 313 comprises a high-capacity hard disk device or the like, and has a file storing unit 3131 and a file information DB 3132. The file storing unit 3131 stores electrical files (documents, images, speech files, and the like) managed by the service server 3. The file information DB 3132 stores folder information on a file stored in the file storing unit 3131, and information on an access authority to a file/folder.

The service server 3 has the display unit 315 and the input unit 316 from the standpoint of maintenance or the like. The display unit 315 includes an output device like an LCD (Liquid Crystal Display). The input unit 316 input arbitrary data and information.

The communication unit 317 comprises an NIC (Network Interface Card) or the like, and serves as an interface for connecting the service server 3 to the network 5. The communication unit 317 may include, for example, a modem device, an infrared communication device.

The system bus 318 is a transmission path for forwarding an order or data among the controller 310, the RAM 311, the ROM 312, the storing unit 313, the display unit 315, the input unit 316, the communication unit 317.

Figure 11:
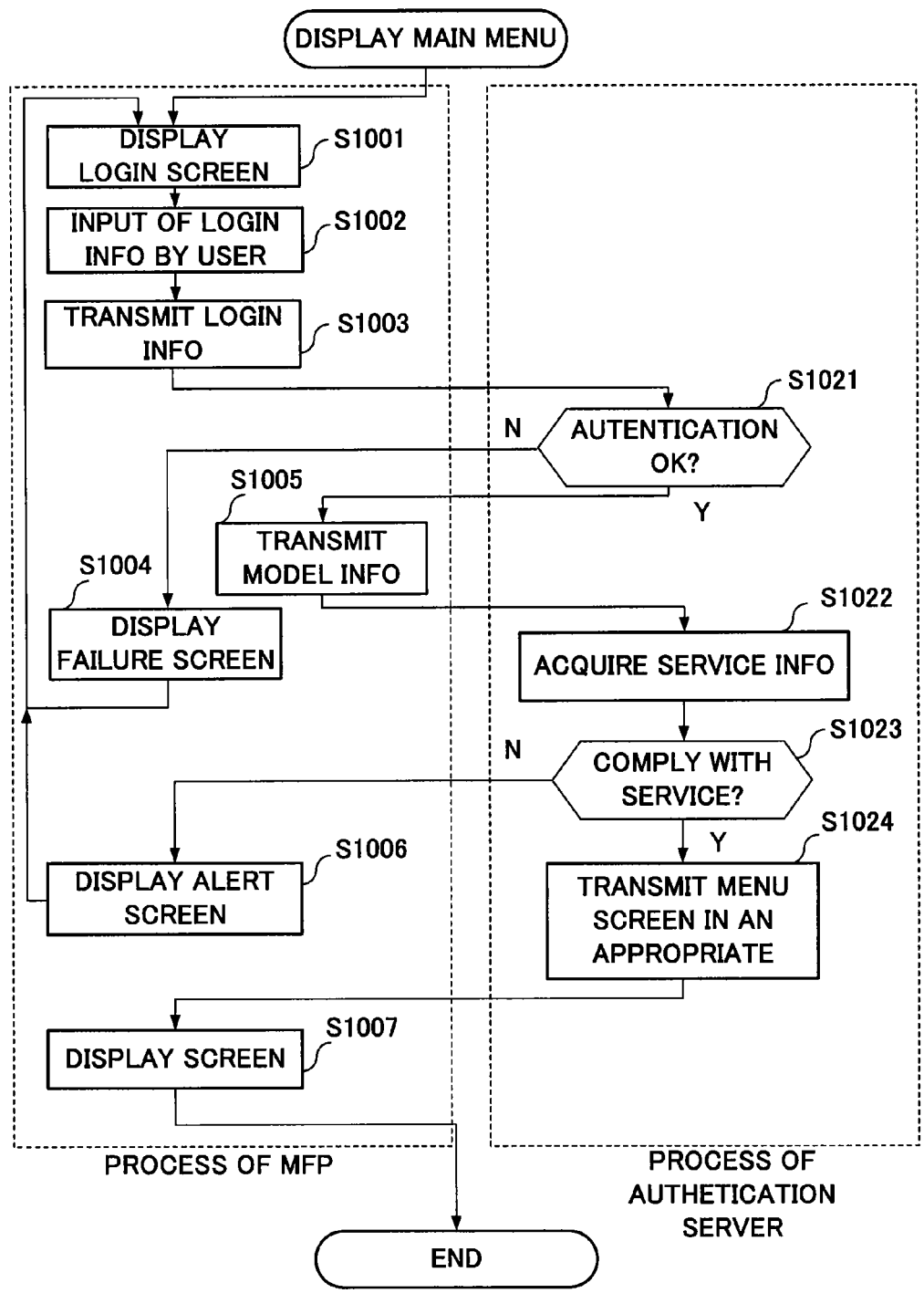
FIG. 11 is a flowchart for explaining a menu screen display process.

A flow of utilizing the function of the image processing system through an MFP 1 will be explained below. FIG. 11 is a flowchart from launching the MFP 1 to displaying a main menu.

Figure 10A:
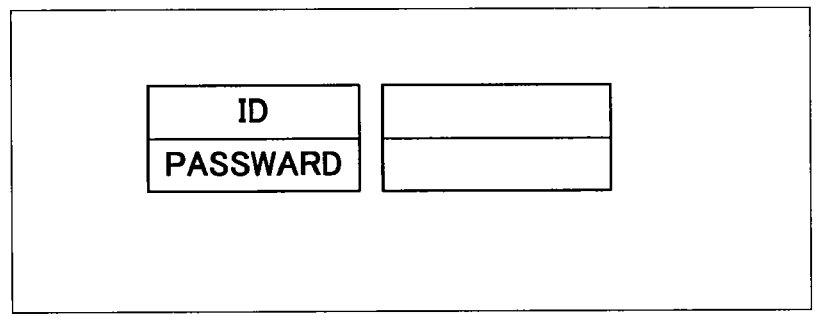
FIGS. 10A to 10D are diagrams showing examples of screens displayed on a display device of the MFP.

As the power is turned ON by a user, the controller 110 reads out a predetermined start-up program from the ROM, and displays a login screen shown in FIG. 10A on the display device 122. When having displayed the login screen, the controller 110 stands by until a user makes manipulation (step S1001). The login screen is also displayed in a case where no manipulation is entered for a few minutes after a screen is changed to another screen, or in a case where termination of each function is entered.

The user enters login information (user ID and password) through the touch panel 123, or enters the information by causing the IC card reader 124 to read out the IC card of the user. In entering the information through the touch panel 123, an entered content is set by pressing a confirmation button (step S1002). As the entered content is set, the controller 110 transmits the login information to the authentication server 2, and waits for an authentication result (step S1003). The scheme of entering information for user authentication is not limited to the foregoing one, and for example, biometrics may be employed.

The authentication server 2 performs authentication using the transmitted user ID and password (step S1021). If the authentication result is OK (step S1021: YES), the authentication server 2 transmits a notification to that effect to the MFP 1, and performs operation of displaying a menu screen to be discussed later. If the authentication result is NG (No Good) (step S1021: NO), the authentication server 2 transmits a notification to that effect to the MFP 1.

In receiving the notification to the effect that the authentication results in OK, the controller 110 transmits model information for specifying the device model of the MFP 1 to the authentication server 2 together with the login information through the communication unit 116 (step S1005). The controller 210 of the authentication server 2 receives the login information transmitted from the MFP 1 through the communication unit 217. The controller 210 specifies information on a service that the user has an authority to utilize based on the received user ID. That is, the controller 210 acquires a service ID corresponding to the user ID from the membership information DB 2131 (step S1022). The controller 210 determines whether or not the MFP 1 can provide the service corresponding to the service ID based on the model information received from the MFP 1 (step S1023). Specifically, the controller 210 checks the model information (model ID) received from the MFP 1 with the model information DB 2134, thus specifying whether or not the MFP 1 is able to provide the service that the user has an authority to utilize. The controller 210 keeps saving the model information and the user ID of the user logging on the MFP 1 received from the MFP 1 in the RAM 211 until the user logs off from the MFP 1 (the user is logged off in a case where no manipulation is made for a few minutes after the user has logged in or in a case where the user enters termination of each function), and reads out in accordance with necessity.

When having determined that the service can be provided to the user having an authority to utilize (step S1023: YES), the controller 210 refers the screen DB 2133, and acquires part image data (button or the like) corresponding to the service that the user has an authority to utilize, and information on operations (e.g., launching a specific application) when the service is selected. The controller 210 combines part images, and creates one menu screen. Further, the controller 210 modifies the size of the menu screen to fit to the display device 122 of the MFP 1 based on the model information received in the step S1022, and transmits the modified menu screen to the MFP 1 together with the information on operations when the part image is manipulated (step S1024). The MFP 1 displays the menu screen data received through the communication unit 116 on the display device 122 (step S1007).

On the other hand, when having determined that the MFP 1 does not comply with the service that the user has an authority to utilize from the received model information (step S1023: NO), the controller 210 of the authentication server 2 transmits a notification to that effect to the MFP 1. In this case, the controller 110 of the MFP 1 displays an alert message to the effect that the service is not available on the display device 122. Alternatively, the controller 110 may not display a part (button) for selecting that service (step S1006).

When receiving the notification to the effect that the authentication results in NG (step S1021: NO), the MFP 1 displays a message to the effect that login is failed on the display device 122 (step S1004), and displays a screen prompting entrance of login information again (step S1001).

Figure 10B:
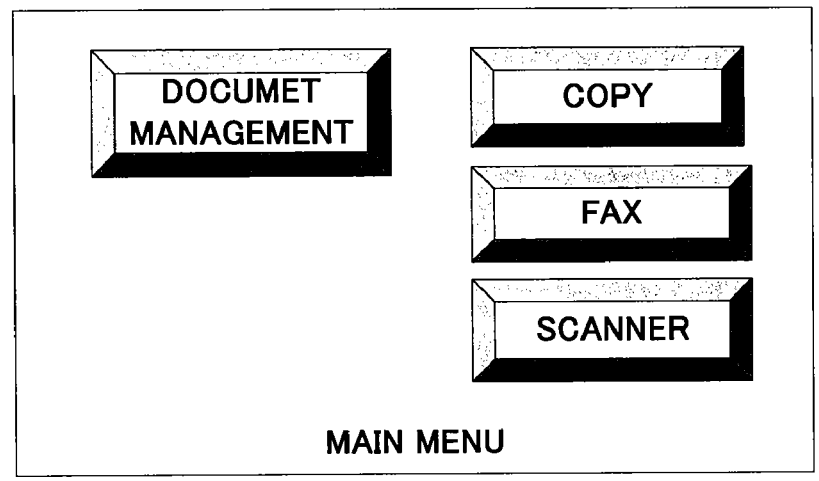
Figure 10C:
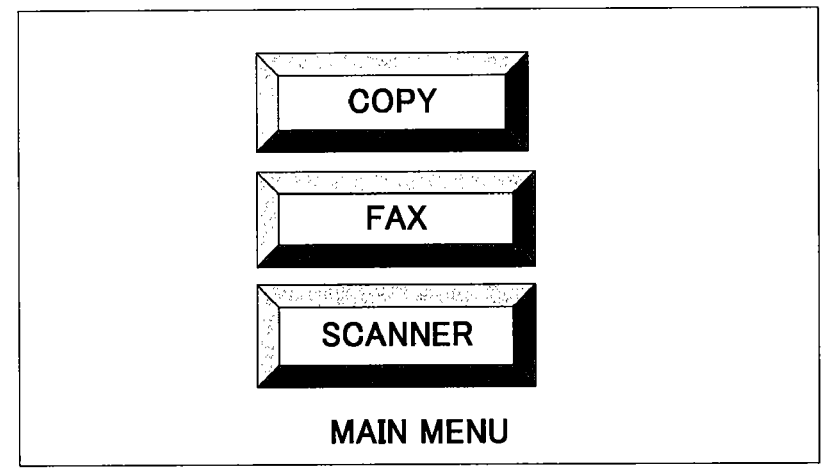
Figure 10D:
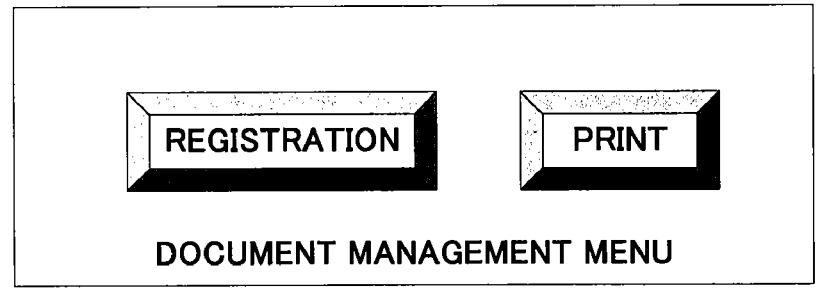

FIGS. 10B and 10C respectively show examples of main menus for a user A (user having a user ID of 0000A) and a user B (user having a user ID of 0000B) when login is successful. Let us supposed that the user A has service IDs S0001, S0003, S0004, S0005, S1001, S1002, and S2001 as indicated in the membership information DB 2131 in FIG. 6. The authentication server 2 refers the service information DB 2132, and specifies services available from a main menu. That is, a service having a "main menu" registered in a "menu" field is acquired. The services selectable from the main menu are services having service IDs of S0001, S0003, S0004, and S0005. Thus, as shown in FIG. 10B, the controller 210 creates a main menu having a document management button (for company A), a copy button, a fax button, and a scanner button corresponding to those service IDs, and transmits the main menu to the MFP 1. The MFP 1 displays the received menu screen on the display device 122.

In contrast, the user B has authorities to utilize services specified by service IDs S0003, S0004, and S0005. Thus, as shown in FIG. 10C, a copy button, a fax button, and a scanner button for selecting services corresponding to the service IDs S0003, S0004, S0005 are displayed in the main menu of the MFP 1.

As a user selects a button through a main menu, information on a menu screen executable only services that the user has authorities to utilize is transmitted from the authentication server 2 to the MFP 1.

An explanation will be given of operations when the user A selects the document management button through the main menu of FIG. 10B as an example.

(Document Management Button)

As the user A selects the document management button through the main menu, the controller 110 of the MFP 1 notifies to the authentication server 2 that the user A selects the document management button. When receiving a notification, the controller 210 of the authentication server 2 refers the membership information DB 2131, and specifies that the IDs of services that the user A has authorities to utilize through a document management menu are S1001 (registration service) and S1002 (print service). The controller 210 acquires plural pieces of image data corresponding to the services specified by those service IDs and plural pieces of information on operations when those services are selected from the screen DB 2133, and transmits the acquired data and information to the MFP 1. At this time, information on what service server 3 should be utilized is transmitted as an operation in menu selection. Specifically, the authentication server 2 refers the server information DB 2135, and specifies a server (in this case, server A) which provides a document management service to the organization (company A) where the user A belongs. As the menu image and the information on operations in menu selection are received from the authentication server 2, the MFP 1 displays a menu that a registration function and a print function are selectable on the display device 122.

As a button displayed in the document management menu is selected, the MFP 1 establishes communication sessions with a service server 3 selected by the authentication server 2. As a registration button is selected, the MFP 1 scans a document, and registers the scanned document at a location designated by the user in a storing area managed by the service server 3. As a print button is selected, a file stored at a location designated by the user and managed by the service server 3 is selected and printed.

(Menu Selectable from Basic Function)

According to the embodiment, it is possible to give an authority user by user for options of the basic functions, such as a copy function and print function. For example, in a case where use of color copying is desirably limited to a specific user, color copying is registered in the service information DB 2132 as a service available from a copy menu (see, FIG. 7). A service ID specifying a color copy service is registered in the membership information DB 2131 to a user whom an authority is desirably given (see, user ID 0000A in FIG. 6), and links to image data on a button for color copying, and information on set operations when the service is selected are prepared in the screen DB 2133. This allows the authentication server 2 to create screen information on a menu that color copying is selectable in a case where the user A selects a copy button through the main menu.

However, because an MFP 1 which does not comply with each function is present, functions that an MFP 1 comply with are registered in the model information DB 2134 device model by device model. The authentication server 2 creates menu screen information for only a service that the device model of an MFP 1 manipulated by the user complies with among services that the user has authorities to utilize with reference to the device model information DB 2134, and transmits the information to the MFP 1.

Only the color copy function has been explained above, but the same is true on any options of basic functions shown in FIG. 8, and use of service can be limited user by user. That is, a service ID may be allocated to a basic function option that an authority to utilize is desirably to be given to a user, and the service ID may be registered in the service information DB 2132. The service ID may be registered in the membership information DB 2131 in association with the ID of the user whom the authority to utilize is desirably to be given.

Regarding individual basic functions (e.g., the print function, and the scan function utilized through the registration function) utilized through the document management service, the authentication server 2 creates plural pieces of different menu screen information in accordance with the authorities of the users and functions that individual MFPs 1 comply with.

(Fee Charge)

Next, an explanation will be given of a flow that the service provider charges a fee to a service user.

The controller 210 of the authentication server 2 refers the membership information DB 2131 for each predetermined period (e.g., for each month), and acquires information for specifying all services that each user has authorities to utilize. Information on total fee of all services that the user has authorities to utilize is acquired, and the total fee is summed. The controller 210 performs this process for all users belonging to a registered organization, and sums the amount of fee. The summed amount of fee is charged to the registered organization. For example, as shown in FIG. 6, let us supposed that the user A and the user C belong to the company A. At this time, monthly service fees for the user A and the user C are 1200 Yen and 500 Yen, respectively, a total of 1700 Yen is charged to the company A.

Further, the controller 210 of the authentication server 2 refers the rental information DB 2136 table, and calculates a rental fee or a lease fee to be charged to each organization. For example, in referring the rental information DB 2136, as a rental (lease) fee having a name of an organization renting (leasing) an MFP 1 stored in association with the name of the company A is added, a rental (lease) fee to be charged to the company A is obtained. A usage fee can be charged to each company while adding the calculated rental (lease) fee to the service fee calculated beforehand, or applying a discount based on the calculated rental (lease) fee.

The authentication server 2 has the rental information DB 2136 in the embodiment. However, each MFP 1 may store the name of an organization which rents (leases) the MFP 1 in association with a rental (lease) fee if the MFP 1 is rented or leased. The authentication server 2 may acquires plural pieces of rental (lease) information from all MFPs 1 in the system, and counts a rental (lease) fee for each organization.

According to the embodiment, a fixed fee is set user by user, not organization by organization, and this eliminates a needlessness of paying a fee for a service unnecessary for all users, and a needlessness of giving an authority to use to individual user, from the standpoint of an organization. Moreover, because an authority to utilize a service is also given to a user, the user can feel free to use the service. In a case where the common MFP 1 is shared by different companies, the fee to be charged to each company is clarified. Further, there is an advantage such that fee charging is easy for a service provider which provides services.

Note that in the embodiment, a unit of an organization of each user is a company base, but may be set more specifically, like a section base.

(History Management)

According to the image processing system of the embodiment, an MFP 1 always transmits manipulation information including the content of manipulation, identification information (user ID) for a user who manipulates the MFP 1, and the like to the authentication server 2 when the user performs some manipulations to the MFP 1. The authentication server 2 stores the received manipulation information in the history information DB 2137. This enables the user to figure out which file is accessed if the file undergone document management is subjected to unauthorized access through the MFP 1.

It is possible to prohibit a user from utilizing a specific service more than or equal to a predetermined times based on history information. The controller 210 can calculate how many times a user has utilized individual services from the history information. Therefore, in a case where the user has utilized a service more than or equal to predetermined times, service information on that service may not be acquired in the step S1022.

Or, in a case where a user utilize a service specified by a specific service ID, a mail or the like to that effect may be sent to an administrator or a system manager to notify that the user utilize the service specified by the specific service ID, thus managing unfair usage by the user.

It is expected that managing history information suppresses ineffectual usage (e.g., unnecessary printing) by a user.

(Maintenance)

According to the image processing system of the embodiment, the controller 110 of each MFP 1 regularly (e.g., once per hour) checks the status of the MFP 1, i.e., the states of hardwares and equipments. In a case where consumable items, such as a toner and an oil become less than or equal to a predetermined amount or the MFP 1 itself becomes in an abnormal condition (e.g., out of service), information on a status (hereinafter, called "status information") is transmitted to the authentication server 2. In accordance with the status information, the authentication server 2 returns menu screen data on a menu screen for normal services in which a menu for maintenance is arranged to the MFP 1.

Figure 12:
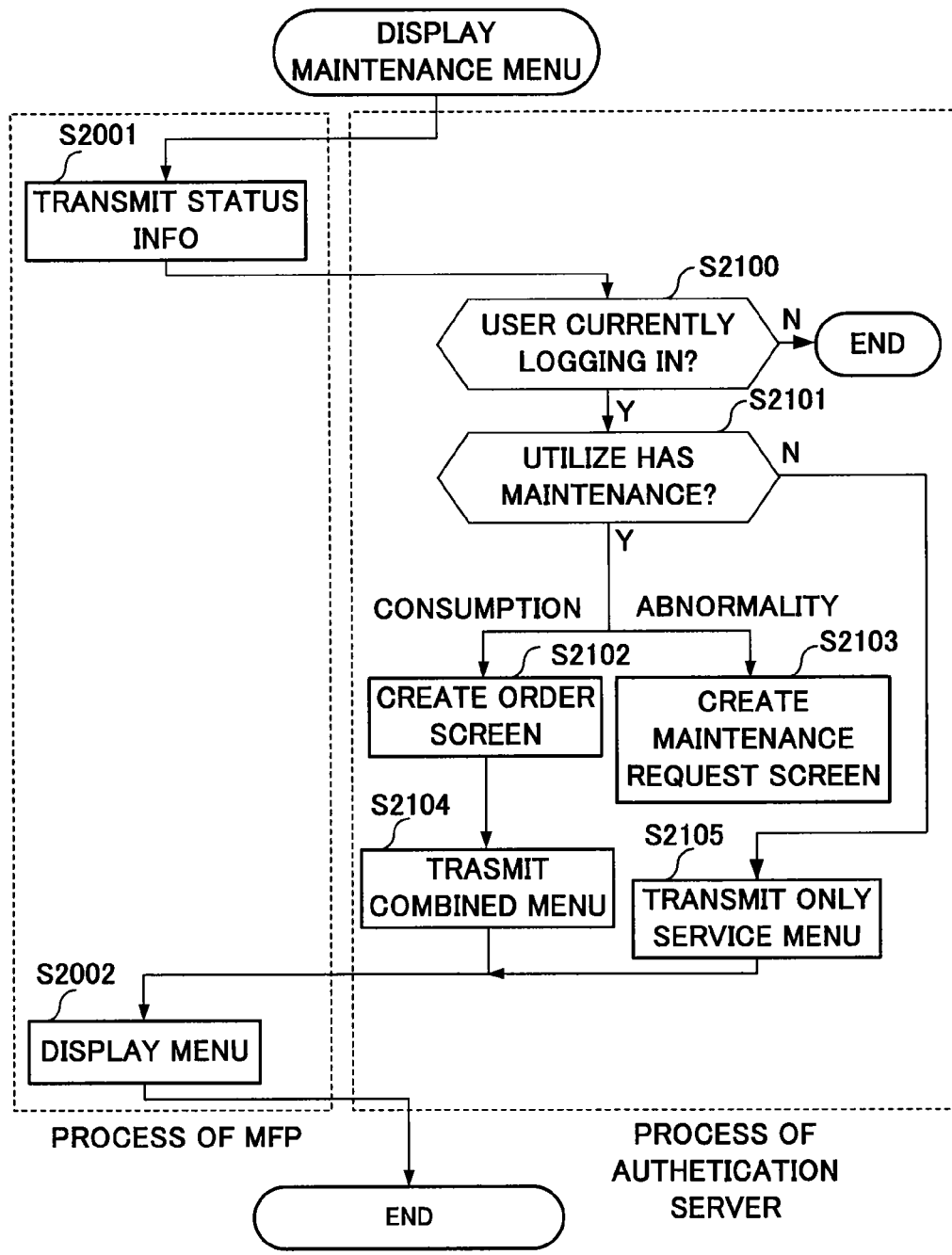
FIG. 12 is a flowchart for explaining a process of displaying a maintenance menu.

A flow until a screen for performing maintenance is displayed is shown in FIG. 12. Let us supposed that the authentication server 2 has a status table, which stores a supplier of each consumable item, an inspection company to be called when inspection is necessary, and the like in association with the identification information of an MFP 1 for all MFPs 1 in the system, in the storing unit 213. Moreover, let us supposed that the authentication server 2 stores the ID of a user who currently logs on an MFP 1, which has transmitted status information, in the RAM or the like. Further, let us supposed that a couple of users has registered a service ID corresponding to a maintenance authority in the membership information DB 2131 in association with their user IDs to obtain a maintenance authority.

An MFP 1 regularly transmits its status information together with identification information for identifying itself to the authentication server 2 (step S2001). The controller 210 of the authentication server 2 determines whether or not a user is currently logging on the MFP 1 which has transmitted the status information (step S2100). When it is determined that a user is not currently logging on (step S2100: NO), this means that no user who manipulates the MFP 1 is present, the process is terminated, and a maintenance screen is not displayed.

On the other hand, when it is determined that a user is currently logging on, it is then determined whether or not the user has a maintenance authority (step S2101). That is, if a service ID corresponding to the maintenance authority is registered in the membership information DB 2131 in association with the user ID of the login user, the controller 210 determines that the user has the maintenance authority.

In a case where a user having the maintenance authority is logging on (step S2101: YES), processes from S2102 to S2104 are executed. That is, if the received status information is information on consumption of a consumable item, the controller 210 refers the status table, and creates information on an order screen for ordering the consumable item to the supplier (step S2102). If the status information indicates abnormality of a device, the controller 210 refers the status table, specifies an inspection company, and creates information on a maintenance request screen for requesting inspection to the inspection company (step S2103). The controller 210 combines the created maintenance screen information (order screen information or maintenance request screen information) with menu screen information for services created to be displayed for the user currently logging on the MFP 1 (e.g., screen information created in the step S1024) and creates one screen information, and transmits the information to the MFP 1 (step S2104). The MFP 1 displays the screen of the received information on the display device 122 (step S2002).

If the user having the maintenance authority is not logging on (step S2101: NO), the screen information created in the step S1024 is directly transmitted to the MFP 1.

Because the authentication server 2 creates maintenance screen information in this manner, it is not necessary to individually register an inspection company or a supplier of a consumable item in all MFPs 1, thus reducing the burden of a system manager.

Second Embodiment

In the foregoing embodiment, the explanation has been given of the image processing system which provides a document management service as a service other than the basic functions that an MFP 1 provides. The explanation has been also given of the case where application programs, such as a spreadsheet display application and a document display application necessary to display a document on an MFP 1 in utilizing the document management service are stored in the storing unit 113 of the MFP 1 beforehand. In the present embodiment, however, an explanation will be given of an MFP 1 which downloads an application program in accordance with necessity, and provides a new service other than the basic functions.

The image processing system of the embodiment has the same structure as that of the first embodiment. The authentication server 2 further has an individual information DB 2138 in the storing unit 213.

The individual information DB stores individual identification information for specifying an MFP 1, a model ID for specifying the device model of the MFP 1 specified by the individual identification information, and install information on what application program is installed in the MFP 1, in association with one another.

With reference to the flowchart of FIG. 13, a flow of a process from when a user successfully logs on an MFP 1 to when a main menu is displayed will be explained. Note that steps until the user tries to log on the MFP 1 are the same as steps S1001 to S1003 and S1021 in FIG. 11.

As user authentication successes, the MFP 1 transmits individual identification information for specifying the MFP 1 to the authentication server 2 (step S1101). The authentication server 2 refers the service information DB 2132, and acquires a service ID associated with the login ID, i.e., the ID of a service that the user has an authority to utilize (step S1122).

Subsequently, the controller 210 of the authentication server 2 refers the individual information DB 2138, and acquires model information (model ID) associated with the individual identification information transmitted in the step S1005. The controller 210 refers the model information DB 2134, and acquires model information associated with the acquired model ID (step S1123).

The controller 210 performs the process in steps S1124 to S1131 for each service acquired in the step S1122. That is, while the step S1131 results in NO, the process from the step S1124 to S1130 are executed for the services associated with the login information.

First, the controller 210 refers the model information DB 2134, and determines whether or not a device that the user is currently manipulating complies with services (functions) that the user has authorities to utilize (same process as that of the step S1023) (step S1124). When it is determined that the device complies with the services (step S1124: YES), like the process in the step S1024 in FIG. 11, the controller 210 refers the screen DB 2133, acquires part image data corresponding to a currently-attention-getting service and information on operations when the part image is manipulated (step S1125), and the process progresses to the step S1131.

On the other hand, if the MFP 1 does not comply with the currently-attention-getting service (step S1124: NO), the controller 210 determines whether or not the service is already installed in the MFP 1 (step S1126). Whether the service is installed or not is determined by checking whether or not the service is registered in association with the MFP 1 while referring the individual information DB 2138. If registered, this means that the service is already installed in the MFP 1, and the service is available through the MFP 1.

If the service is installed (step S1126: YES), the process progresses to step S125, part image data corresponding to the currently-attention-getting service, and information on operation when the part image is selected are acquired, and the process progresses to step S1131.

If the service is not installed (step S1126: NO), the controller 210 determines whether or not the service is downloadable (step S1127) and whether or not a downloaded program is installable (step S1128).

Whether or not the service is downloadable can be determined by setting the authentication server 2 to have a list of downloadable services in the storing unit 213, and to determine whether or not the service is registered in the table (downloadable if registered, and not downloadable if not registered).

Whether or not a service application program is installable in the MFP 1 is determined in the following manner. In the embodiment, information on an OS or a CPU are registered in the model information DB 2134, in addition to function information of a model specified by each model ID. The controller 210 determines whether or not the service application program is installable in the MFP 1 based on such information (information on an OS and a CPU).

In a case where a service is not downloadable (step S1127: NO), or in a case where a program is not installable (step S1128: NO), because the controller 210 does not display a currently-attention-getting service in a menu, the process progresses to step the S1131. When there is another service acquired in the step S1122, a process with respect to this service is executed from the step S1124.

When it is determined that the currently-attention-getting service is not installed in the MFP 1 but is downloadable and installable (step S1126: NO, step S1127: YES, and step S1128: YES), the controller 210 refers the screen DB 2133, and like the process in the step S1125, acquires part image data corresponding to the currently-attention-getting service and information on operations when the part image is selected (step S1129). Then, the controller 210 additionally sets operation information to the effect that an installation process for that service is to be performed, and then operations acquired in the step S1129 are to be executed in parts selection (step S1130).

The controller 210 executes the process from the step S1124 to the step S1130 with respect to all services which is acquired in the step S1122 and that the user has authorities to utilize through a main menu. When the process is completed to all services (step S1131: YES), a main menu screen is created based on all acquired part images and information on operations when the part images are selected. Further, the service controller 210 modifies the size of the menu screen to appropriately fit to the size of the display device 122 of the MFP 1 based on the model information received in the step S1101, and transmits the modified menu screen to the MFP 1 together with information on operations when the part image is selected (step S1131). The MFP 1 displays the menu screen data, received through the communication unit 116, on the display device 122 (step S1102).

In a case where the user manipulates the menu screen displayed on the display device 122 of the MFP 1, and selects a service function not yet installed in the MFP 1, the MFP 1 first transmits an installation request to the authentication server 2 based on operation process information associated with the part image. The authentication server 2 which has received the installation request transmits an application program for the service to the MFP 1. The MFP 1 locally installs the received application program, and then executes an operation process associated with the part image. A screen which asks a user whether or not to install an application may be displayed to give the user an opportunity to select prior to installation of the application. When the MFP 1 succeeds installation of the program of the service, the MFP 1 transmits a notification to that effect to the authentication server 2. The controller 210 of the authentication server 2 registers the ID of the installed service in the individual information DB 2138 in association with the individual identification information of the MFP 1.

Examples of downloadable services will be explained below. Note that in a case where an MFP 1 functions as a client, it is supposed that a service server 3 functions as a server.

(Application Service)

The application service works together with the document management service. In the application service, first, the scanner unit 119 of an MFP 1 scans a document. Next, the controller 110 of the MFP 1 checks the configuration of a description written in the scanned document. If it is acceptable, the scanned document is transmitted to a service server 3 (server which provides the document management service). If the configuration of the description is not acceptable (e.g., when an omission is present), a comment to the effect that the document is not acceptable is displayed on the display device 122 of the MFP 1, and the document is not transmitted to the service server 3. This service is utilized in a case where an application in a predetermined form is managed by a server.

To execute the application service, it is necessary that the MFP 1 complies with a scanner function.

(Form Print Service)

The form print service works together with the document management service, and is a service of applying a form template to an excel file or an access file managed by the document management service provided by a service server 3 and printing it through an MFP 1. In the form print service, first, a user downloads a file that the user wants to print from a service server 3 in accordance with an instruction in a screen displayed on the display device 122 of an MFP 1. Next, the MFP 1 acquires information on a list of form templates and template identification information associated with each template and specifying the template, both stored in the storing unit 313, from the service server 3. The MFP 1 displays the acquired template list on the display device 122 in such a way that a form template is selectable.

As the user manipulates the touch panel 123 of the MFP 1 and selects one of the displayed form templates, the MFP 1 transmits a download request to the service server 3 together with template identification information for specifying the selected form template. In response to the request, the service server 3 transmits a form template specified by the transmitted template identification information to the MFP 1 which has transmitted the download request. The MFP 1 applies the transmitted form template to the excel file or the access file downloaded beforehand, and print a form.

To execute the form print service, it is necessary that the MFP 1 complies with, for example, a fast-printing function, and a sorting function as print functions and copes with a piece of paper larger than or equal to a size A3.

(Map Print Service)

The map print service is a service of printing map information around an address entered by manipulating an MFP 1. A service server 3 stores map information around an address in the storing unit 313 in association with address information. A user enters an address in accordance with an instruction in a screen displayed on the display device 122 of the MFP 1. The MFP 1 transmits the entered address information to the service server 3. The service server 3 acquires map information stored in association with the received address information from the storing unit 313, and transmits the acquired map information to the MFP 1. The MFP 1 print the image of the received map information.

To execute the map print service, it is necessary that the MFP 1 complies with, for example, a color copy function.

(Order Reception/Placement Service)

The order reception/placement service is a service of receiving/placing an order through an MFP 1. A service server 3 stores order reception information received from an order reception/placement system or the like connected thereto via the network in the storing unit 313. As a user manipulates the input device of an MFP 1 to instruct execution of an order reception service, the MFP 1 transmits an inquiry message for inquiring whether or not order reception/placement information is newly stored in the storing unit 313 to the service server 3. In a case where new order reception information is stored, the service server 3 transmits the order reception information to the inquiring MFP 1. The MFP 1 prints out the transmitted order reception information.

On the other hand, in placing an order, the same process as that of the application service can be performed. An application sheet for placing an order is scanned by the scanner 119, and a scanned document is saved in a folder which is stored in the storing unit 313 of the service server 3 and is for managing order sheets. The order reception/placement system regularly refers the folder, and places an order based on a new order sheet when the new order sheet is stored.

To execute the order reception/placement service, it is necessary that the MFP 1 complies with a scanner function, and a print function.

Likewise, services are downloaded in accordance with necessity regarding other menus selected from a main menu.

The document management service explained in the first embodiment may be downloaded from the authentication server 2 like the individual services of the embodiment.

As explained above, according to the embodiment, the authentication server 2 provides a menu screen customized user by user to an MFP 1 based on login information on a user transmitted from the MFP 1. Intermediation of the authentication server 2 enables customization of not only a main menu, but also a sub menu user by user. Because the authentication server 2 manages information on services available for a user all together, it is possible not only to change the content of a service available through an MFP 1 in accordance with the position and authority of a user, but also to provide the same service to users always through a plurality of MFPs 1 without a setting for each MFP 1. It is thus expected that this greatly reduces the work of a system manager. Further, it becomes possible to cope with various MFPs by changing the size of a menu and limiting functions selectable from the menu based on model information transmitted from an MFP 1. Further, because a menu related to a service unavailable for a user is not displayed on the display device 122 of an MFP 1, the menu becomes simple, thus improving the operability.

In the foregoing embodiments, services and options of document management, and functions of an MFP are registered in the service information DB 2132, but a setting and successive operations of an MFP 1 that an individual user often utilizes may be registered. An example of the setting that an individual user often utilizes is aggregation of two pages into one page. An example of the successive operations of the MFP 1 that an individual user often users is to scan a document, send a facsimile to a predetermined address and save it in a document management system.

A service registered in the service information DB 2132 may be a charged or a free service. In a case where the foregoing color copying service is registered as a free service, usage of the service can be limited to each user. That is, as long as the service ID thereof is registered in the membership information DB, a user can not utilize the service. In registering not only services but also the content of a detailed option of each service in the service information DB 2132, preparing images of option screens, and specifying a user who can utilize those options, it becomes possible to display a further customized screen on the display device 122 of an MFP 1 user by user.

In the foregoing embodiments, by registering a service ID registered in the service information DB 2132 in the membership information DB 2131, an authority to utilize a service specified by the service ID is given to a user. However, the service ID of a service that an authority to use is not given to a user among default services may be registered in the membership information DB 2131. In this case, a default menu may be prepared in the screen DB, and a function that a user is limited to use may not be displayed on the default menu.

In the foregoing embodiments, some services and functions of an MFP 1 are selectively explained in detail, but services and functions of an MFP 1 are not limited to the explained ones.

In the first embodiment, to notify the device model of an MFP 1 to the authentication server 2, the MFP 1 transmits model information itself to the authentication server 2, but like the second embodiment, individual identification information may be transmitted to the authentication server 2. In this case, it is necessary that the authentication server 2 further stores a table associating the individual identification information on the MFP 1 with model information in the storing unit. The authentication server 2 specifies the device model of the MFP 1 through the table. The authentication server 2 refers the model information DB 2134, and determines whether or not the model of the MFP 1 can provide a service that a user has an authority to utilize.

In the foregoing embodiments, a part image constituting a menu is stored in the screen DB 2133, but a part defining file (information on operations of each part) may be stored therein, instead of the part image. The authentication server 2 creates one menu defining file with those part defining files, and transmits the created file to an MFP 1. In this case, the MFP 1 has an application that converts the received menu defining file into a format which can be displayed on the display device 122 to display the menu defining file on the display device 122.

An MFP 1 of the foregoing embodiments is an MFP which has a plurality of units realizing various functions, such as a printer unit, and a scanner unit. However, a scanner, a copier, a printer, or a facsimile may be utilized alone, or those devices may be combined. An MFP 1 is disposed in, for example, an office, an outside location, such as a satellite office, a convenience store, or a post office. That is, an MFP 1 can be located at any place as long as the MFP 1 can be connected with the authentication server 2 and a service server 3 via the network 5.

In the foregoing embodiments, the explanation has been given of the case where the operation programs of an MFP 1, authentication server 2, and service server 3 are stored in respective memories or the like beforehand. However, a program which allows devices to execute the above-described operations may be stored in a computer-readable recording medium, such as a flexible disk, a CD-ROM (Compact Disk Read-Only Memory), a DVD (Digital Versatile Disk), an MO (Magneto-Optical disk), distributed, and installed on respective MFP 1, authentication server 2, and service server 3 to constitute devices which execute the above-described operations.

Moreover, a program may be stored in a disk device or the like of a predetermined server device on a communication network like the Internet, superimposed on a carrier wave to be downloaded by an MFP 1, an authentication server 2, and a service server 3. Further, running and executing a program while transferring the program through a communication network realizes the above-described processes.

The authentication server 2 and the service server 3 of the foregoing embodiments can be realized by exclusive hardware.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-252710 filed on Sep. 19, 2006 and Japanese Patent Application No. 2007-139421 filed on May 25, 2007 including specification, claims, drawings and summary. The disclosure of the above Japanese Patent Applications is incorporated herein by reference in its entirety.

What is claimed is:

1. An image processing system, comprising:
 an image managing device;
 an image processing device which is connected to said image managing device via a network, wherein
 said image managing device comprises:
 a function-information storing unit configured to store function information associating a user with information for specifying a function that the user has an authority to utilize through said image processing device;
 a function-information acquisition unit configured to receive user identification information transmitted from said image processing device, and configured to acquire a function information correspondence with a user specified by the received user identification information, from said function-information storing unit; and a menu transmission unit configured to prepare a menu screen of a function that the user has the authority to utilize, based on the function information acquired through said function-information acquisition unit, and configured to transmit the menu screen to said image processing device, and said image processing device comprises:

a transmission unit configured to accept input of user identification information by a user, and configured to transmit the input user identification information to said image managing device;

a display unit configured to receive the menu screen from said menu transmission unit, and configured to display the received menu screen;

a selection unit configured to select an function from said menu screen in response to manipulation of the user;

an execution unit configured to execute a process of realizing the function selected by said selection unit;

a history storing unit configured to store manipulation history information including identification information on a service that a user has utilized, in association with identification information of the user; and a function limitation unit configured to control said menu transmission unit not to prepare a menu for selecting a predetermined service when the user utilizes the predetermined service more than or equal to a predetermined number of times, to thereby limit usage of the predetermined service by the user.

2. An image managing device which is connected to a image processing device via a network and supplies a manipulation menu screen to the image processing device, comprising:

a service information storing unit configured to store service information associating a user with a service that the user has an authority to utilize through the image processing device;

a service information acquisition unit configured to receive user identification information transmitted from the image processing device, and configured to acquire service information correspondence with a user specified by the received user identification information from said service information storing unit;

a menu transmission unit configured to prepare a menu screen for selecting a service available for the user based on the service information acquired by said service information acquisition unit, and configured to transmit the menu screen to the image processing device;

a history storing unit configured to store manipulation history information including identification information on a service that a user has utilized, in association with identification information of the user; and a function limitation unit configured to control said menu transmission unit not to prepare a menu for selecting a predetermined service when the user utilizes the predetermined service more than or equal to a predetermined number of times, to thereby limit usage of the predetermined service by the user.

3. The image managing device according to claim 2, further comprising:

a model information reception unit configured to receive model information specifying a device model of the image processing device from the image processing device;

a model-by-model function storing unit configured to store function information specifying a function available on the image processing device, model by model; and a function information readout unit configured to read out function information correspondence with a device model specified by the model information received by said model information reception unit from said model-by-model function storing unit, wherein said menu transmission unit creates a menu screen based on service information acquired by said service information acquisition unit and function information read out by said function information readout unit.

4. The image managing device according to claim 2, further comprising:

a device identification information reception unit configured to receive device identification information unique to the image processing device from the image processing device;

a function information storing unit configured to store function information for associating the device identification information with a function available on the image processing device specified by the device identification information; and a function information readout unit configured to read out function information correspondence with the device identification information received by said device identification information reception unit from said function information storing unit, wherein said menu transmission unit creates menu screen based on service information acquired by said service information acquisition unit and function information read out by said function information readout unit.

5. The image managing device according to claim 2, further comprising:

a model information reception unit configured to receive model information specifying a device model of the image processing device from the image processing device;

a model-by-model display information storing unit configured to store display information specifying a size of a display unit of the image processing device, model by model; and a display information readout unit configured to read out display information correspondence with a device model specified by the model information received by said model information reception unit from said model-by-model display information storing unit, wherein said menu transmission unit creates a menu screen based on service information acquired by said service information acquisition unit and display information read out by said display information readout unit.

6. The image managing device according to claim 2, wherein the image processing device has a copy function, a facsimile function, a scanner function, a function of manipulating a file on a predetermined server connected to the network, and a function of registering a file on the predetermined server; and said menu transmission unit transmits a menu screen including an item for selecting a function that the user has an authority in the copy function, the facsimile function, the scanner function, the file manipulation function, and the file registering function.

7. The image managing device according to claim 2, further comprising:

a fee storing unit configured to store information on a fee for a service provided for the image processing device; and a service fee count unit configured to acquire information on a fee for a service that a user has an authority to utilize from said fee storing unit user by user stored in said service information storing unit, and configured to count a service fee.

8. The image managing device according to claim 2, wherein
said menu transmission unit prepares a menu screen for instructing download of an application program from a program storing unit to execute the service when a service specified by service information acquired by said service information acquisition unit is not installed on the image processing device, and transmits the menu screen to the image processing device.

9. The image managing device according to claim 2, further comprising a status information reception unit configured to receive device identification information for specifying the image processing device, and status information including at least a remaining amount of a consumable item that the image processing device utilizes, in association with each other, wherein
said menu transmission unit prepares a maintenance menu screen together with a menu screen for selecting a service available for a user based on status information received by said status information reception unit, creates a combined menu screen of the menu screen for selecting the service and the maintenance menu screen, and transmits the combined menu screen to the image processing device.

10. The image managing device according to claim 9, wherein
status information at least includes either remaining amount information on a consumable item utilized by the image processing device and information on a state of a hardware of the image processing device, and
said menu transmission device prepares a maintenance menu screen for ordering a consumable item when status information received by said status information reception unit is information on the remaining amount of the consumable item, and when it is determined that the remaining amount is less than or equal to a predetermined amount, and prepares a menu screen for asking maintenance when the received status information indicates an abnormality of the hardware of the image processing device.

11. A method of providing a manipulation menu screen to a image processing device connected via a network, comprising:
storing service information which associates a user with a service that the user has an authority to utilize through the image processing device in a storage;
receiving user identification information transmitted from the image processing device, and acquiring service information correspondence with a user specified by the received user identification information from the storage;
preparing a menu screen for selecting a service available for the user based on the acquired service information, and transmitting the menu screen to the image processing device;
storing manipulation history information including identification information on a service that a user has utilized, in association with identification information of the user; and
controlling a menu transmission unit not to prepare a menu for selecting a predetermined service when the user utilizes the predetermined service more than or equal to a predetermined number of times, to thereby limit usage of the predetermined service by the user.

12. The method of claim 11, comprising:
providing a model information reception unit configured to receive model information specifying a device model of the image processing device from the image processing device;
providing a model-by-model function storing unit configured to store function information specifying a function available on the image processing device, model by model; and
providing a function information readout unit configured to read out function information correspondence with a device model specified by the model information received by said model information reception unit from said model-by-model function storing unit, wherein
said menu transmission unit creates a menu screen based on service information acquired by said service information acquisition unit and function information read out by said function information readout unit.

13. The method of claim 11, comprising:
providing a device identification information reception unit configured to receive device identification information unique to the image processing device from the image processing device;
providing a function information storing unit configured to store function information for associating the device identification information with a function available on the image processing device specified by the device identification information; and
providing a function information readout unit configured to read out function information correspondence with the device identification information received by said device identification information reception unit from said function information storing unit, wherein
said menu transmission unit creates menu screen based on service information acquired by said service information acquisition unit and function information read out by said function information readout unit.

14. The method of claim 11, comprising:
providing a model information reception unit configured to receive model information specifying a device model of the image processing device from the image processing device;
providing a model-by-model display information storing unit configured to store display information specifying a size of a display unit of the image processing device, model by model; and
providing a display information readout unit configured to read out display information correspondence with a device model specified by the model information received by said model information reception unit from said model-by-model display information storing unit, wherein
said menu transmission unit creates a menu screen based on service information acquired by said service information acquisition unit and display information read out by said display information readout unit.

15. The method of claim 11, wherein
the image processing device has a copy function, a facsimile function, a scanner function, a function of manipulating a file on a predetermined server connected to the network, and a function of registering a file on the predetermined server; and
said menu transmission unit transmits a menu screen including an item for selecting a function that the user has an authority in the copy function, the facsimile function, the scanner function, the file manipulation function, and the file registering function.

16. The method of claim 11, comprising:

providing a fee storing unit configured to store information on a fee for a service provided for the image processing device; and providing a service fee count unit configured to acquire information on a fee for a service that a user has an authority to utilize from said fee storing unit user by user stored in said service information storing unit, and configured to count a service fee.

17. The method of claim 11, wherein said menu transmission unit prepares a menu screen for instructing download of an application program from a program storing unit to execute the service when a service specified by service information acquired by said service information acquisition unit is not installed on the image processing device, and transmits the menu screen to the image processing device.

18. The method of claim 11, comprising providing a status information reception unit configured to receive device identification information for specifying the image processing device, and status information including at least a remaining amount of a consumable item that the image processing device utilizes, in association with each other, wherein said menu transmission unit prepares a maintenance menu screen together with a menu screen for selecting a service available for a user based on status information received by said status information reception unit, creates a combined menu screen of the menu screen for selecting the service and the maintenance menu screen, and transmits the combined menu screen to the image processing device.

19. A computer readable storage medium encoded with a program for providing a manipulation menu screen to a image processing device, and which allows a computer to:

perform the steps of:

storing service information which associates a user with a service that the user has an authority to utilize through the image processing device in a storage;

receiving user identification information transmitted from the image processing device, and acquiring service information correspondence with a user specified by the received user identification information from the storage;

preparing a menu screen for selecting a service available for the user based on the acquired service information, and transmitting the menu screen to the image processing device;

storing manipulation history information including identification information on a service that a user has utilized, in association with identification information of the user; and controlling a menu transmission unit not to prepare a menu for selecting a predetermined service when the user utilizes the predetermined service more than or equal to a predetermined number of times, to thereby limit usage of the predetermined service by the user.

* * * * *